(12) United States Patent
Sarkisian

(10) Patent No.: US 7,512,694 B2
(45) Date of Patent: Mar. 31, 2009

(54) WIRELESS COMMUNICATIONS INVISIBLE PROXY AND HOOKING SYSTEMS AND METHODS

(75) Inventor: Drew Sarkisian, Austin, TX (US)

(73) Assignee: Bytemobile, Inc.

( * ) Notice: Subject to any disclaimer, the term of this patent is extended or adjusted under 35 U.S.C. 154(b) by 501 days.

(21) Appl. No.: 09/982,511

(22) Filed: Oct. 17, 2001

(65) Prior Publication Data

US 2002/0059438 A1 May 16, 2002

Related U.S. Application Data

(60) Provisional application No. 60/241,086, filed on Oct. 17, 2000, provisional application No. 60/241,096, filed on Oct. 17, 2000, provisional application No. 60/241,095, filed on Oct. 17, 2000, provisional application No. 60/241,087, filed on Oct. 17, 2000, provisional application No. 60/240,985, filed on Oct. 17, 2000, provisional application No. 60/220,730, filed on Jul. 26, 2000, provisional application No. 60/180,649, filed on Feb. 7, 2000, provisional application No. 60/177,329, filed on Jan. 21, 2000.

(51) Int. Cl.
*G06F 17/30* (2006.01)

(52) U.S. Cl. ............... 709/230; 709/203; 709/219; 709/229; 370/401; 719/328

(58) Field of Classification Search ........... 709/217, 709/218, 219, 230, 232, 203, 229; 370/352, 370/401; 719/328
See application file for complete search history.

(56) References Cited

U.S. PATENT DOCUMENTS

| | | | | |
|---|---|---|---|---|
| 5,446,736 A | * | 8/1995 | Gleeson et al. | 370/473 |
| 5,613,090 A | * | 3/1997 | Willems | 719/329 |
| 5,627,829 A | * | 5/1997 | Gleeson et al. | 370/230 |
| 5,673,322 A | | 9/1997 | Pepe et al. | |
| 5,724,355 A | * | 3/1998 | Bruno et al. | 370/401 |
| 5,732,074 A | * | 3/1998 | Spaur et al. | 370/313 |
| 5,841,764 A | * | 11/1998 | Roderique et al. | 370/310 |
| 5,963,339 A | * | 10/1999 | Kobayashi | 358/439 |
| 5,987,611 A | * | 11/1999 | Freund | 726/4 |
| 6,058,422 A | | 5/2000 | Ayanoglu et al. | |
| 6,065,120 A | | 5/2000 | Laursen et al. | |
| 6,104,505 A | * | 8/2000 | Malik | 358/434 |
| 6,158,011 A | * | 12/2000 | Chen et al. | 726/15 |
| 6,199,068 B1 | * | 3/2001 | Carpenter | 707/100 |
| 6,247,048 B1 | * | 6/2001 | Greer et al. | 709/219 |
| 6,275,693 B1 | | 8/2001 | Lin et al. | |

(Continued)

*Primary Examiner*—Alina N. Boutah
(74) *Attorney, Agent, or Firm*—The Law Firm of H. Dale Langley, Jr., P.C.

(57) ABSTRACT

An communications service provider provides wireless access to a packetized data network, such as the Internet. The service provider includes a server computer. The server computer is connected to the network, which is at least in part a wired network. The wired network is connected to a cellular wireless communications system. A method of the network includes a client device that communicates wirelessly with the server computer. The client device runs standard applications programs, such as browser, ftp, and e-mail. The method includes serving a first information by the server computer to the client device according to a specialized protocol, determining that the first information accords with the specialized protocol, and proxying the first information to the standard programs in a standard protocol readable by the standard programs.

13 Claims, 2 Drawing Sheets

U.S. PATENT DOCUMENTS

| | | | |
|---|---|---|---|
| 6,292,833 B1 | 9/2001 | Liao et al. | |
| 6,304,881 B1 | 10/2001 | Halim et al. | |
| 6,324,564 B1 * | 11/2001 | Thielke et al. | 709/202 |
| 6,336,137 B1 | 1/2002 | Lee et al. | |
| 6,343,318 B1 * | 1/2002 | Hawkins et al. | 709/219 |
| 6,374,268 B1 * | 4/2002 | Testardi | 707/205 |
| 6,385,195 B2 * | 5/2002 | Sicher et al. | 370/356 |
| 6,398,105 B2 * | 6/2002 | Ramberg et al. | 235/375 |
| 6,415,329 B1 * | 7/2002 | Gelman et al. | 709/245 |
| 6,480,506 B1 * | 11/2002 | Gubbi | 370/468 |
| 6,487,278 B1 * | 11/2002 | Skladman et al. | 379/88.13 |
| 6,539,422 B1 * | 3/2003 | Hunt et al. | 709/217 |
| 6,606,649 B1 * | 8/2003 | Schwitters et al. | 709/206 |
| 6,886,046 B2 * | 4/2005 | Stutz et al. | 709/246 |
| 2001/0022784 A1 * | 9/2001 | Menon et al. | 370/352 |
| 2001/0025315 A1 * | 9/2001 | Jolitz | 709/231 |
| 2002/0062439 A1 * | 5/2002 | Cotugno et al. | 713/170 |
| 2006/0200532 A1 * | 9/2006 | Skladman et al. | 709/206 |

* cited by examiner

WIRELESS COMMUNICATIONS INVISIBLE PROXY AND HOOKING SYSTEMS AND METHODS

CROSS-REFERENCE TO RELATED APPLICATIONS

This application is related to U.S. Provisional Patent Application No. 60/241,086 titled "Wireless Communications Invisible Proxy and Hooking Systems and Methods", filed Oct. 17, 2000, co-pending herewith and which is hereby incorporated herein by this reference.

The present application is related to U.S. Pat. No. 6,166,729, entitled "Remote Digital Image Viewing System and Method", issued Dec. 26, 2000 (CPA filed Oct. 26, 1999); U.S. Provisional Patent Application No. 60/177,329, entitled "Wireless Network System and Method", filed Jan. 21, 2000; U.S. Provisional Patent Application No. 60/180,649, entitled "Digital Image Transfer System and Method", filed Feb. 7, 2000; and U.S. Provisional Patent Application No. 60/220,730, entitled "Wireless Network System and Method," filed Jul. 26, 2000, each of the same inventor hereof, and those respective applications are incorporated herein. The present application is also related to U. S. Provisional Patent Application No. 60/241,096, entitled "Wireless ASP Systems and Methods," filed Oct. 17, 2000, U.S. Provisional Patent Application No. 60/241,095, entitled "E-Mail and Messaging Systems and Methods," filed Oct. 17, 2000, U. S. Provisional Patent Application No. 60/241,087, entitled "Wireless Communications Protocols and Architectures Systems and Methods," filed Oct. 17, 2000, and U.S. Provisional Patent No. 60/240,985, entitled "Browser and Network Optimization Systems and Methods," filed Oct. 17, 2000.

BACKGROUND OF THE INVENTION

The present invention generally relates to wireless communications systems and methods and, more particularly, relates to systems and methods for wireless packetized data communications using specialized protocols and integration interfaces for operations of standard applications.

Conventional packetized data communications protocols and network architectures were developed primarily for use in wired networks and conditions. The protocols and networks are not optimized for the peculiarities of wireless communications environments. Networks, particularly client-server networks such as the Internet, are commonly designed to conform to standardized protocols, for example, the Transport Control Protocol/Internet Protocol (TCP/IP). Software and hardware applications of client devices that are connected to and communicate over these networks, therefore, generally are capable of communicating according to the TCP/IP or other standard protocol.

Where specialized or non-standard protocols are employed in communications on networks, these applications typically are not readily susceptible to communicating according to the specialized protocols. In the past, the applications have generally been re-written or modified to adapt to specialized protocol platforms and other communications nuances. For example, conventional practice has been to replace system DLL files or to use a proxy changing application (e.g., a browser) settings. Of course, such modifications are often costly, time-consuming, or inconvenient. Moreover, the general trend and concern of the communications industry is often expressed to be standardization and integration among multiple platforms and scenarios.

It would be a significant improvement in the art and technology to provide systems and methods for enabling standard software and hardware applications capable of communicating with certain protocols to be capable of communicating with other specialized protocols of networks, such as the Internet and particularly wireless environments, without requiring significant modification of the applications themselves.

SUMMARY OF THE INVENTION

An embodiment of the invention is a wireless communications network. The network includes a wireless communications channel, a wireless application service provider (ASP) server computer communicatively connected to the wireless communications channel, and a client device communicatively connected via the wireless channel to the wireless ASP server computer. The wireless ASP server computer communicates with the client device over the wireless communications channel by a specialized protocol. In certain embodiments, a hooking layer of the client device translates the specialized protocol to a standard protocol for use by standard applications programs of the client device.

Another embodiment of the invention is a method of wireless communications. A client device communicates wirelessly with a wireless application service provider (ASP) server computer. The client device runs standard programs. The method includes serving a first information by the wireless ASP server computer to the client device according to a specialized protocol, determining that the first information accords with the specialized protocol, and proxying the first information to the standard programs in a standard protocol readable by the standard programs.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Network with Wireless ASP System

Figure 1:
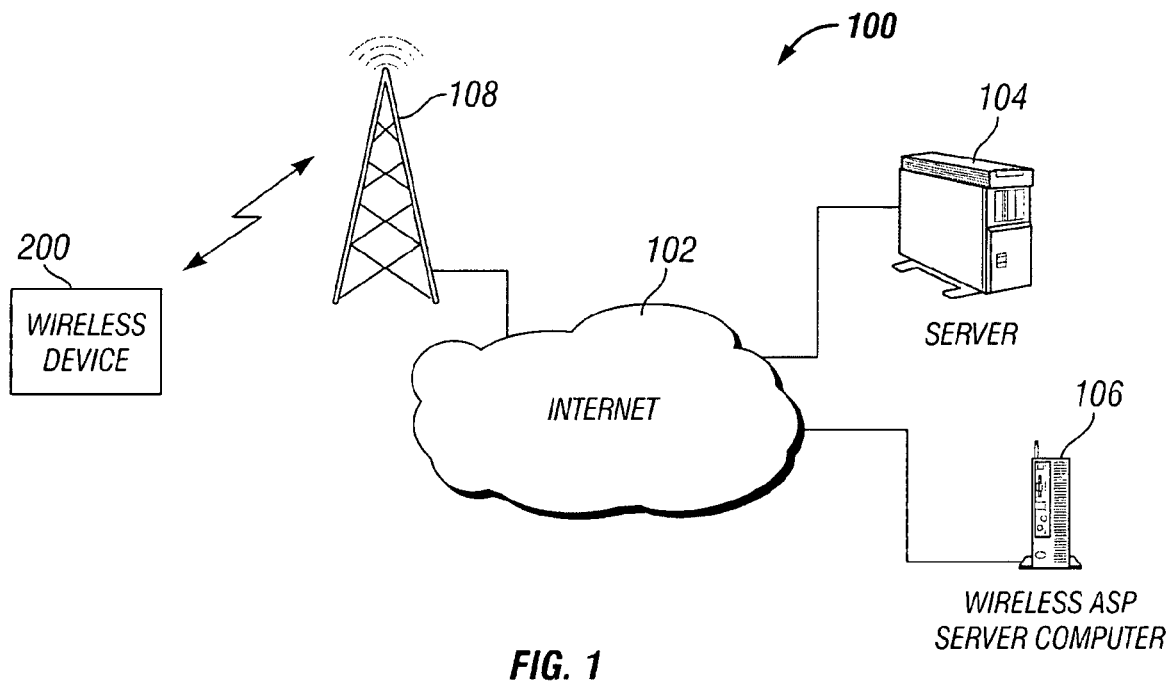
FIG. 1 illustrates a network, for example, the Internet, including a wireless communications portion and a wireless application service provider (ASP) system including a wireless ASP server computer in wireless communications with a wireless device.

Referring to FIG. 1, a communications system 100 includes a wireless communications portion and a wired communications portion. The system 100 includes a network, such as the Internet 102. The network is operable according to a particular packetized data protocol, such as transport control protocol/Internet protocol (TCP/IP) or some other network protocol. The network, such as the Internet 102, interconnects various computing and communications devices, for example, among other devices, a server computer 104 and a wireless ASP server computer 106. The server computer 104 and the wireless ASP server computer 16 are each one or more server computers including a microprocessor, memory storage, and communications capabilities via wire or wireless connection with the Internet 102. The server computer 104 and the wireless ASP server computer 106 communicate over the Internet 102 or other network via the particular protocol of the network, such as the standard Internet network protocol TCP/IP.

The network, such as the Internet 102, is also connected with a wireless communications service provider 108. The wireless communications service provider 108 is, for example, a cellular or other packetized data wireless communications network, such as a cellular digital packet data ("CDPD") or other network. The wireless service provider 108 connects by wire connection with the network, such as the Internet 102. Alternatively, the wireless communications service provider 108 could connect with the network 102 by other communications connection, such as fiber optic, coax cable, wireless channel, or other communications connection. Furthermore, although the wireless communications service provider 108 is illustrated as a single particular communications channel, multiple links and multiple channels of those links, for example, communications links of wired and wireless channels, can alternatively provide the same functions and are included for purposes of the description.

The wireless service provider 108 is capable of communicating through wireless channels with various devices, such as a wireless device 200. The wireless device 200 is a processing device, such as a data-enabled cellular telephone, a personal digital assistant, a laptop computer, or any of a wide variety of other processing devices that can wirelessly communicate with the wireless service provider 108. Of course, the wireless device 200 includes communications equipment for accomplishing the wireless communication with the wireless service provider 108, such as wireless modem.

The wireless device 200 communicates through the wireless service provider 108 and over the network, such as the Internet 102, with the wireless ASP server computer 106. The wireless ASP server computer 106 serves as a dedicated server for the wireless device 200 in its communications. The wireless ASP server computer 106 sends and receives communications to and from the wireless device 200 over the network, such as the Internet 102, and on through the wireless service provider 108. The wireless ASP server computer 106 also communicates over the network, such as the Internet 102, with other network connected devices, such as the server computer 104, via particular protocols in communications channels enabled for such communications on the network. In certain embodiments, for example, the wireless ASP server computer 106 and the wireless device 200 communicate with specialized protocols, such as optimized packetized data protocols, for example, optimized TCP/IP protocols or other protocols such as described in the related patent applications.

Communications between the wireless ASP server computer 106 and the wireless device 200 over the network, including through the wireless service provider 108 and the wireless portion, are performed according to special optimized, non-standard protocols and formats. Communications between the wireless ASP server computer 106 and other portions and elements of the Internet, for example, with the server computer 104, are performed according to different protocols and formats, such as standard networking formats like TCP/IP. For purposes of example here, the network protocol is that of the Internet 102 (i.e., TCP/IP) and certain embodiments of non-standard protocols and formats, for the wireless communications between the wireless ASP server computer 106 and the wireless device 200, are described in the related patent applications. The optimized protocols and formats are not limited to those of the related applications, however, and the same principles and concepts described herein apply to other situations and designs, as well.

Figure 2:
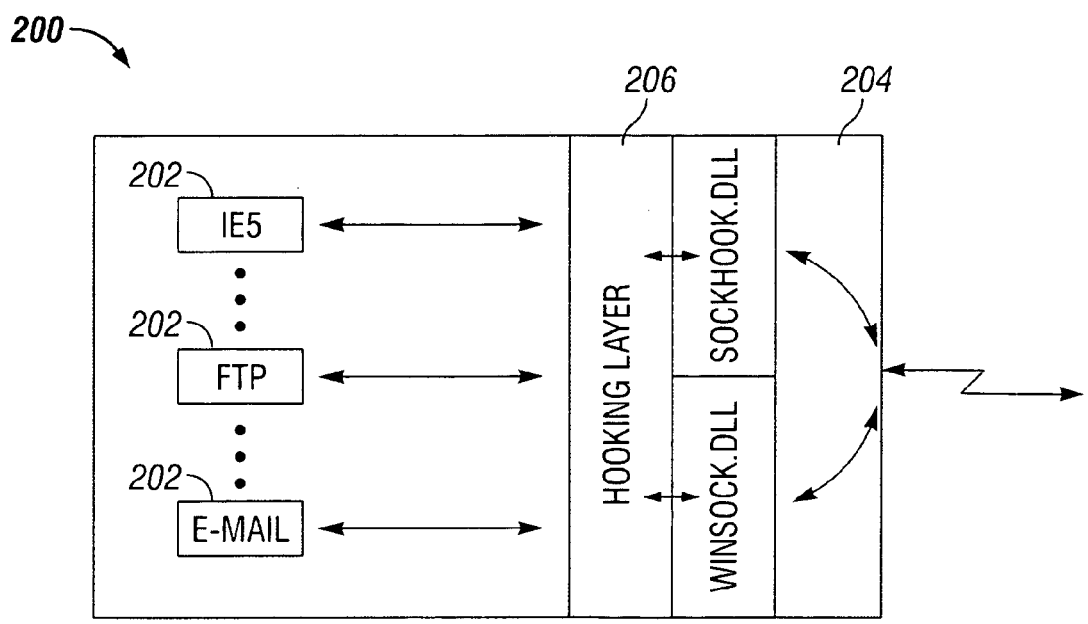
FIG. 2 illustrates a hooking layer for intercepting standardized format communications and serving as an invisible proxy to specialized format communications, according to embodiments of the present invention.

Referring to FIG. 2, the wireless device 200 of FIG. 1 includes various standard or typical application programs 202. These programs 202 include, for example, a browser (e.g., Internet Explorer™), an FTP application (e.g., Bullet Proof™ FTP), and an e-mail client application (e.g., Eudora™). The programs 202 can, of course, be software applications, or firmware or hardware implementations. In any event, the programs 202 receive or use communications over the network's typical protocols, such as TCP/IP, which differ from the specialized protocols of communications between the wireless device 200 and the wireless ASP server computer 106. The wireless device 200 also includes communications elements 204, such as a wireless modem and applications for communicating with the wireless ASP server computer 106 over the wireless portions of the network 200. The communications elements 204 include features for communicating with the wireless ASP server computer 106 according to the specialized protocols for such communications, as previously mentioned and as described in the related patent applications.

Additionally, the wireless device 200 also includes a hooking layer 206, operably connected between the programs 202 and the communications elements 204. The hooking layer 206 is implemented either in hardware or software and is resident on or communicatively connected to the wireless device 200. The hooking layer 206 functions to allow communications of signals received by the communications elements 204 to be communicated, via either an application-standard socket (e.g., Winsock) or a specialized socket (i.e., Sockhook), between the communications elements 204 and the programs 202 in forms acceptable to the programs 202. In effect, the application-standard protocol data received by the wireless device 200 is passed to the programs 202 via the standard sockets and any non-standard specialized protocol data received by the wireless device 202 is translated to be acceptable to the programs 202.

Particularly, the hooking layer 206 includes sets of the standard dynamic link libraries (DLLs) (e.g., Winsock.dll) associated with the programs 202. The hooking layer 206 also, however, includes a specialized set of non-standard DLLs (i.e., Sockhook.dll) that are specific for the specialized protocols and allow for appropriate action of the programs 202 in connection with communications according to the specialized protocols of the network 100. As those skilled in the art will know and appreciate, the non-standard DLLs of the hooking layer 206 will depend upon the particular specialized protocols. In any event, the hooking layer 206 serves, in effect, as an invisible proxy to the programs 202 to make communications received by the wireless device 200 useable by the programs, whether such communications conform to standard network protocols or specialized optimized protocols.

Figure 3:
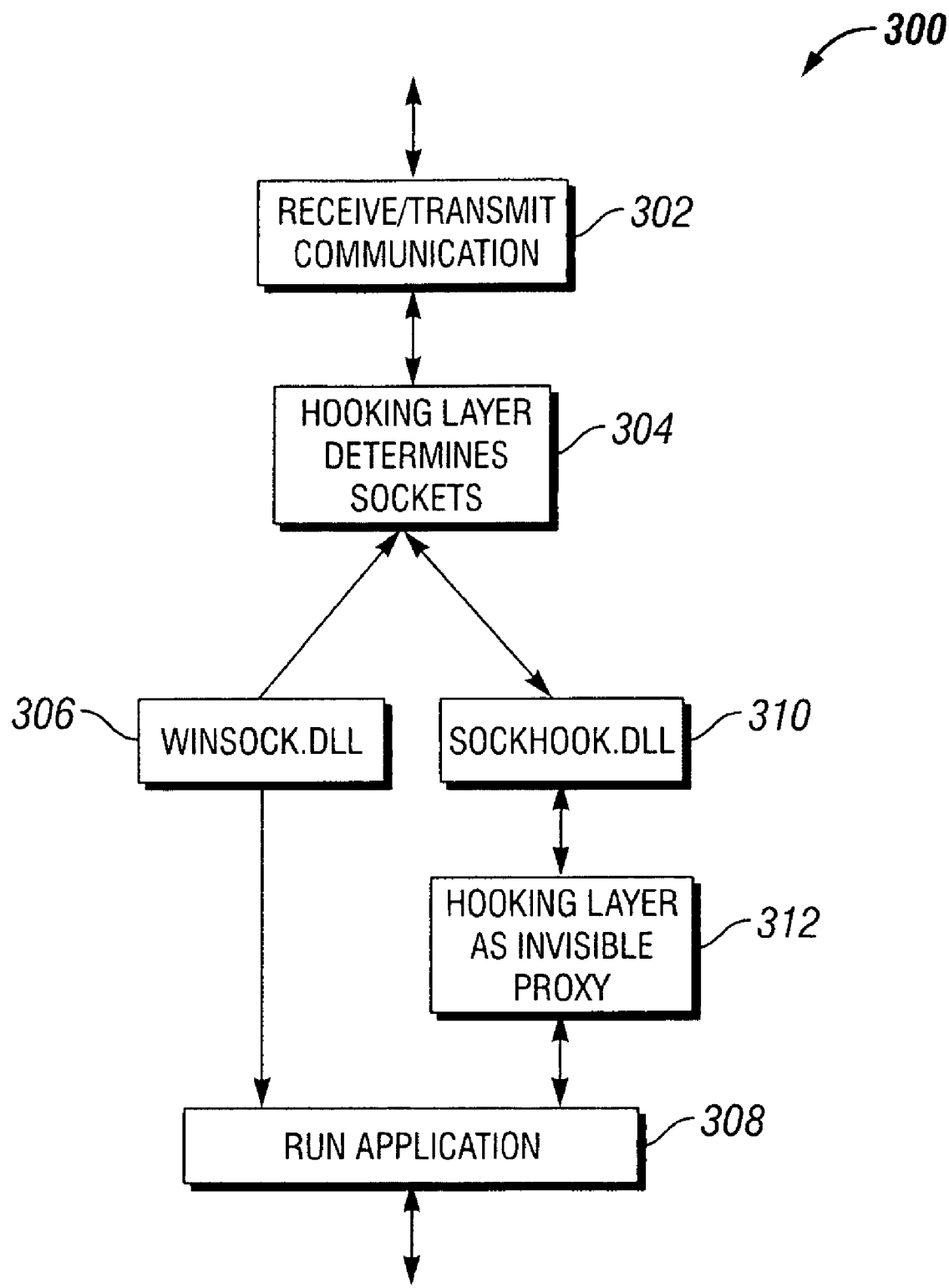
FIG. 3 illustrates a method of operation of the hooking layer of FIG. 2, according to embodiments of the present invention.

Referring to FIG. 3, a method 300 of operation of the wireless device 200 and the hooking layer 206 is a form of switch that determines the applicable DLLs for the protocols of the communications and then provides an applicable socket for the programs 202. The method 300, when a communication is received by the wireless device 200, for example, a wireless communication, commences with a step 302 of receiving the communication 302. The communication is received in the step 302 by the modem and other communication elements of the wireless device 200.

In a step 304, the hooking layer 206 determines whether standard or non-standard sockets are appropriate, based on whether the received communication conforms to standard protocols or non-standard protocols, respectively. If the communication conforms to standard protocols of the network 100, for example, TCP/IP protocols of the Internet, then the hooking layer 206 invokes the standard sockets and standard DLLs, such as Winsock sockets and Winsock.dll. The communication is then conveyed via the socket to the programs 202, and the application performed by the programs 202 is run in a step 308.

If, on the other hand, the communication is determined by the hooking layer 206 to be non-standard protocols, such as optimized wireless protocols of the related patent applications or others, then the hooking layer 206 invokes appropriate non-standard DLLs and acts as an invisible proxy in a step 312. As an invisible proxy in the step 312, the hooking layer 206 serves to interact with the received communication and the programs 202 by providing the information of the communication to the programs in form acceptable to the programs 202. In acting as an invisible proxy, the hooking layer 206 sets up a non-standard socket (i.e., Sockhook) and uses the non-standard DLLs (i.e., Sockhook.dll). In effect, the hooking layer 206 in the step 312 receives the communication information in the form of the non-standard protocols, such as of the wireless portion of the network 100, and manipulates the information to the form of the standard protocols of the network 100, such as TCP/IP. The hooking layer 206, acting as invisible proxy in the step 312, provides the communicated information to the programs 202 for a step 308 of running the programs 202 using the information in acceptable form to the programs 202.

In transmission communications of the wireless device 200, the substantial reverse of the method 300 occurs. The application is run in a step 308, and the result is delivered to the hooking layer 206. At the hooking layer 206, the hooking layer 206 again serves as an invisible proxy in a step 312, although this time the hooking layer 206 manipulates the information from a standard protocol form to the non-standard protocols. The hooking layer 206 invokes the specialized socket and specialized DLLs for the manipulation, in the steps 304, 310, 312. The wireless device 200 then transmits in a step 302 the information, formatted according to the specialized protocols, for example, the optimized wireless protocols. These specialized protocols are, thus, employed over the wireless portion of the network 100 in communications both ways between the wireless device 200 and the wireless ASP server computer 106.

In operation of the systems 100, 200 and the method 300, numerous alternative business and technical arrangements are possible. Of course, the wireless ASP server computer 16 must be capable of communicating via typical network protocols with other network connected devices in order to receive and deliver messages from and to those network connected devices, and then transfer those messages on or receive those messages from the wireless device 20, as appropriate. Moreover, although only particular devices of a communications network and its nodes are herein described and discussed, particularly, primarily the wireless device 200 and the wireless ASP server computer 106, the wired device 240 and the network 100, such as the Internet, have been described with regard to the embodiments, it is to be expressly understood that combinations of those elements, such as a plurality of any, certain ones, all of those elements, and even additional or alternative elements, is possible in keeping with the scope of the embodiments herein.

The network could be an intranet, or even an intranet combination or intranet-extranet combination. Numerous banks of the wireless ASP server computer 16 can be possible for receiving communications from pluralities of wireless devices, and the wireless ASP server computers can be centrally located or distributed through a wide geographic area. In the case of a global network such as the Internet, the network is capable of communicating by its protocols, which may include other specialized protocols for specific situations.

The wireless ASP server computer in such instance can communicate with various devices on the network according to those other specialized protocols, if properly equipped as would be known to those skilled in the art. In general, the communications between the wireless device or devices and the wireless ASP server computer or computers occurs according to optimized protocols for wireless communications. These optimized protocols can be implemented entirely in software or alternatively can be hardware, combinations of hardware and software, or other mechanisms. The protocols of the hardware or software, as the case may be, for the wireless communications will, in any event, provide increased communications efficiency, speed, and adaptation for the wireless environment.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A communications network, the communications network includes a network portion operable according to a standard network protocol and a wireless communication link that is not the network portion operable according to a non-standard optimized wireless protocol, comprising:

a server computer, capable of communicating a first data over the wireless communication link in accordance with the non-standard optimized wireless protocol, and capable of communicating over the network portion in accordance with the standard network protocol;

a client device, capable of communicating with the server computer over the wireless communication link in accordance with the non-standard optimized wireless protocol;

a program of the client device, operable at the client device with a program data at the client device, the program data according to the standard network protocol as input and output of the program, the the first data per the non-standard optimized wireless protocol is not necessarily directly operable with the program as the program data, but is representative of the program data per the non-standard optimized wireless protocol;

a hooking layer of the client device, comprising:

a first specialized socket of the client device for receiving the first data per the non-standard optimized wireless protocol and translating at the client device the first data per the non-standard optimized wireless protocol to the program data according to the standard network protocol, for use by the program;

a second specialized socket of the client device for selectively translating at the client device the program data per the standard network protocol to a second data per the non-standard optimized wireless protocol, for selective transmission of the second data per the non-standard optimized wireless protocol to the server computer over the wireless communication link; and a switch of the client device for selecting the first specialized socket and the second specialized socket, respectively, when the client device is communicating the first data and the second data, respectively, with the server computer according to the non-standard optimized wireless protocol over the wireless communication link.

2. The communications network of claim 1, wherein the wireless communications link carries a cellular packetized data for communications of the non-standard optimized wireless protocol between the client device and the server computer.

3. The communications network of claim 1, wherein the wireless communication link is a cellular digital packet data (CDPD) system.

4. The communications network of claim 1, wherein the client device initiates communications with the server computer of a request over the wireless communications link via the non-standard optimized wireless protocol and the server computer responds via the first data over the communications link via the non-standard optimized wireless protocol, and the program of the client device operates via the first data as translated, if necessary, without any return communication to the server computer of the second data.

5. The communications network of claim 4, wherein the hooking layer does not translate the program data to the second data unless the second data is for communication to the server computer.

6. The communications network of claim 1, wherein the program is operative with the first data without translation by the hooking layer.

7. The communications network of claim 6, wherein the switch selects the first specialized socket only if the program is inoperable with the first data and the switch selects the second specialized socket only if the program data is for communication to the server computer as the second data.

8. The communications network of claim 1, wherein the server computer respectively translates to and from the non-standard optimized wireless protocol, from and to the standard network protocol, respectively, for communications over the network portion according to the standard network protocol and communications with the client device over the wireless communications link according to the non-standard optimized wireless protocol, enabling communications of the client device over the network portion through the server computer.

9. A method of wireless communications, wherein a client device communicates wirelessly with a server computer, and wherein the client device runs a standard program using a standard format data, comprising the steps of:

serving a first information by the server computer to the client device according to a specialized protocol receivable by the client device, the first information comprising a non-standard format data because of the specialized protocol;

receiving the first information by the client device according to the specialized protocol;

determining at the client device that the first information comprises the non-standard format data; and translating at the client device the non-standard format data to the standard data useable by the standard program, wherein the client device comprises a hooking layer, the hooking layer comprising:

a first specialized socket of the client device for receiving a first data per a non-standard optimized wireless protocol and translating at the client device the first data per the non-standard optimized wireless protocol to a program data, the program data being an input and output of the program , according to a standard network protocol, for use by the program;

a second specialized socket of the client device for selectively translating at the client device the program data per the standard network protocol to a second data per the non-standard optimized wireless protocol, for selective transmission of the second data per the non-standard optimized wireless protocol to the server computer over the wireless communication link; and a switch of the client device for selecting the first specialized socket and the second specialized socket, respectively, when the client device is communicating the first data and the second data, respectively, with the server computer accord to the non-standard optimized wireless protocol over the wireless communication link.

10. A wireless communications device, comprising:

a specialized communications protocol receiver of a client device for receiving wireless communications having a specialized protocol format, the specialized protocol format for wirelessly communicating with a server computer capable of communications via the specialized protocol format;

an application program of the client device communicatively connected to the specialized communications protocol receiver, the application program operates with a standard data different from the non-standard data; and a hooking layer of the client device communicatively connected to the specialized communications protocol receiver and the application program, the hooking layer receives and translates the non-standard data to the standard data useable by the application program of the client device;

wherein the hooking layer is included in the client device and the hooking directly translates the non-standard data at the client device;

wherein the hooking layer comprises:

a first specialized socket of the client device for receiving a first data per a non-standard optimized wireless protocol and translating at the client device the first data per the non-standard optimized wireless protocol to a program data, the program data being an input and output of the program, according to a standard network protocol, for use by the program;

a second specialized socket of the client device for selectively translating at the client device the program data per the standard network protocol to a second data per the non-standard optimized wireless protocol, for selective transmission of the second data per the non-standard optimized wireless protocol to the server computer over the wireless communication link; and a switch of the client device for selecting the first specialized socket and the second specialized socket, respectively, when the client device is communicating the first data and the second data, respectively, with the server computer according to the non-standard optimized wireless protocol over the wireless communication link.

11. A communications network including a wireless communications link and a standard network communications link distinct from the wireless communications link, comprising:

a server connected to the wireless communications link for communicating over the wireless communications link according to a specialized wireless protocol including a specialized wireless data and connected to the standard network communications link for communicating over the standard network communications link according to a standard network protocol including a standard data, the standard network protocol and the standard data are different than the specialized wireless protocol and the specialized wireless data, respectively, wherein the server connected to the standard network communications link and the wireless communications link, for converting the standard data of the standard network protocol to the specialized wireless data of the specialized wireless protocol for communications of the specialized wireless data over the wireless communications link per the specialized wireless protocol and for converting the specialized wireless data of the specialized wireless protocol of the wireless communications link to the standard data of the standard network protocol for use by the server and for communications by the server over the standard network communications link; and a client communicatively connected to the server via the wireless communications link for communicating with the server in accordance with the specialized wireless protocol on the wireless communications link, comprising:

a wireless network connector for receiving communications according to the specialized protocol from the server over the wireless communications link and for transmitting communications according to the specialized wireless protocol to the server over the wireless communications link;

a hook of the client connected to the network connector;

an application program of the client connected to the hook, the application program operable with the standard data for the application program;

wherein the hook comprises:

a specialized socket of the client device connected to the application program for translating the specialized wireless data to the standard data, for operations of the application program with the standard data, as translated, if the application program is not operable with the specialized wireless data.

12. The network of claim 11, wherein the wireless communications link is wireless cellular.

13. A method of communications between a server and a client over a wireless channel, comprising the steps of:

transmitting a specialized data via a specialized protocol in communications between the client and the server;

receiving the specialized data via the specialized protocol in communications between the client and the server;

hooking at the client the specialized data received by the client from the server in communications from the server to the client, to discern between an application standard data of the specialized data and an application non-standard data of the specialized data;

wherein the client comprises a hooking layer, the hooking layer comprising:

a first specialized socket of the client device for receiving a first data per a non-standard optimized wireless protocol and translating at the client device the first data per the non-standard optimized wireless protocol to a program data, the program data being an input and output of the program, according to a standard network protocol, for use by the program;

a second specialized socket of the client device for selectively translating at the client device the program data per the standard network protocol to a second data per the non-standard optimized wireless protocol, for selective transmission of the second data per the non-standard optimized wireless protocol to the server computer over the wireless communication link; and a switch of the client device for selecting the first specialized socket and the second specialized socket, respectively, when the client device is communicating the first data and the second data, respectively, with the server computer according to the non-standard optimized wireless protocol over the wireless communication link; and operating an application of the client, the application operable with the application standard data, by translating at the client the application non-standard data to the application standard data for the application.

* * * * *